United States Patent
Roth et al.

(10) Patent No.: US 9,732,168 B2
(45) Date of Patent: Aug. 15, 2017

(54) METHOD OF PREPARING ETHYLENE POLYMERS BY CONTROLLED HIGH PRESSURE POLYMERIZATION

(71) Applicant: BASF SE, Ludwigshafen (DE)

(72) Inventors: Michael Roth, Lautertal (DE); Rudolf Pfaendner, Rimbach (DE); Gerhard Luft, Muhltal (DE); Frank Freidel, Erbach (DE)

(73) Assignee: BASF SE, Ludwigshafen (DE)

( * ) Notice: Subject to any disclaimer, the term of this patent is extended or adjusted under 35 U.S.C. 154(b) by 411 days.

(21) Appl. No.: 13/738,227

(22) Filed: Jan. 10, 2013

(65) Prior Publication Data

US 2013/0150542 A1    Jun. 13, 2013

Related U.S. Application Data

(63) Continuation of application No. 12/490,507, filed on Jun. 24, 2009, now abandoned, and a continuation-in-part of application No. 10/592,726, filed as application No. PCT/EP2005/051130 on Mar. 14, 2005, now abandoned.

(30) Foreign Application Priority Data

Mar. 24, 2004   (EP) .................................... 04101214

(51) Int. Cl.
 *C08F 110/00* (2006.01)
 *C08F 110/02* (2006.01)
 *C08F 10/00* (2006.01)

(52) U.S. Cl.
 CPC ............ *C08F 110/02* (2013.01); *C08F 10/00* (2013.01)

(58) Field of Classification Search
 CPC ................................................... C08F 110/02
 See application file for complete search history.

(56) References Cited

U.S. PATENT DOCUMENTS

| | | | |
|---|---|---|---|
| 3,917,577 A * | 11/1975 | Trieschmann | C08F 110/02 526/208 |
| 4,581,429 A | 4/1986 | Solomon et al. | |
| 5,204,422 A | 4/1993 | Seltzer et al. | |
| 5,449,724 A * | 9/1995 | Moffat et al. | 526/204 |
| 5,914,379 A | 6/1999 | Sutoris et al. | |
| 6,281,311 B1 | 8/2001 | Lai et al. | |
| 6,479,608 B1 | 11/2002 | Nesvadba et al. | |
| 6,894,126 B2 | 5/2005 | Zoller | |
| 6,900,268 B2 | 5/2005 | Fink et al. | |
| 7,030,196 B2 | 4/2006 | Roth et al. | |
| 7,199,245 B2 | 4/2007 | Nesvadba | |
| 7,358,365 B2 | 4/2008 | Roth et al. | |
| 2001/0041774 A1 * | 11/2001 | Minaux | C08F 4/00 526/64 |
| 2003/0204034 A1 | 10/2003 | Charmot et al. | |
| 2003/0216494 A1 * | 11/2003 | Roth et al. | 524/95 |
| 2004/0044158 A1 * | 3/2004 | Wunderlich et al. | 526/220 |
| 2004/0265509 A1 | 12/2004 | Roth et al. | |

FOREIGN PATENT DOCUMENTS

| | | |
|---|---|---|
| EP | 0717054 | 6/1996 |
| EP | 0811590 | 12/1997 |
| JP | 2004529253 A | 9/2004 |
| JP | 2005502601 A | 1/2005 |
| WO | 0190113 | 11/2001 |

OTHER PUBLICATIONS

Editors: B. Elvers, et al., Ullmann's Encyclopedia of Industrial Chemistry, "Polyolefins", VCH Verlags GmbH, Weinheim, 1992, vol. A21, 5th completely rev. ed., pp. 487-515.

Luft, G., et al., "Application of Di-functional Organic Peroxides in the Polymerization of Ethylene under High Pressures", Angew. Macromol. Chem., 1985, vol. 129, pp. 61-70.

* cited by examiner

*Primary Examiner* — Irina Krylova
(74) *Attorney, Agent, or Firm* — Marshall, Gerstein & Borun LLP

(57) ABSTRACT

The present invention relates to a method for the radical polymerization or copolymerization of ethylene at high pressures using a hydroxylamine ester as radical initiator. The hydroxylamine esters according to the invention are suitable initiators for the high pressure polymerization of ethylene leading to high molecular weight polyethylenes with narrow molecular weight distributions (Poyldispersity Index PD=1, 2-4.5).

7 Claims, No Drawings

METHOD OF PREPARING ETHYLENE POLYMERS BY CONTROLLED HIGH PRESSURE POLYMERIZATION

This application is a continuation of U.S. application Ser. No. 12/490,507, which is a continuation in part of U.S. application Ser. No. 10/592,726, abandoned, which is a national stage of PCT/EP 2005/051130, filed Mar. 14, 2005, the contents of which are incorporated by reference.

The present invention relates to a method for the radical polymerization or copolymerization of ethylene at high pressures using a hydroxylamine ester as radical initiator. A further aspect is the use of specific hydroxylamine esters as radical initiators for the (co)polymerization of ethylene.

The manufacture of ethylene polymers (PE) having varying structures and characteristics is well known in the art. There are different polymerization techniques, e.g. high pressure radically initiated polymerization, leading to low density polyethylene (LDPE), coordination polymerization with Ziegler-Natta-, chromium-, aluminium-catalysts, leading to high density polyethylene (HDPE) or polymerization with metallocene catalysts, which affect the molecular structure, such as degree of branching, molecular weight and molecular weight distribution as measured by the polydisperity as well as the physical properties, such as density, crystallinity, melting point and the processing behaviour.

The density of low density polyethylene (LDPE) may vary from 0.910-0.955 g/cm$^3$, whereas commercial products usually have densities of 0.916-0.935. The degree of crystallinity of such products varies between 45-55% with melting points between 105-115° C. LDPE has a random branching structure and contains besides alkyl substituents (short chain branches coming from "back biting" reactions during polymerization) also long chain branches formed by molecular rearrangements of the PE backbone during chain growth.

The processes for the polymerization of ethylene at high temperatures and high pressures by means of initiating free radicals have been known for a long time. Ethylene polymers are obtained by homopolymerizing ethylene or by copolymerizing it with at least one comonomer in a polymerization system, which operates continuously under pressures of 500-3500 bar (50-350 Mpa) and at temperatures of 120-400° C. The polymerization is carried out in continuous tubular reactors or stirred autoclaves in the presence of initiators and optionally of transfer agents (e.g. n-alkanes, ketones, aldehydes, thiols), which adjust the molecular weights of the resulting polymers, however, on the expense of broadening the molecular weight distribution. Most commonly peroxides or hydroperoxides are used as intiators. The polymers are subsequently separated from the volatile substances after their removal from the reactor in separators. A general description of manufacturing processes, properties and use of ethylene polymers is for example given in Ullmann's Encyclopedia of Industrial Chemistry, Vol. A21, Editors: B. Elvers, S. Hawkins, G. Schulz, 5th completely rev. ed. 1992, VCH Verlags GmbH, Weinheim, pp. 487-517.

Molecular structure and physical properties of polyethylenes are not only influenced by manufacturing conditions but also by the type of initiator used. The rate of decomposition, i.e. its half-life time (as a rule ~0.1-1 sec under a given temperature profile), has direct influence on the polymerization rate and, therefore, on the heat of polymerization. The initiator consumption can be considered as a measure for initiator efficiency which influences not only the molecular weight of the resulting polymer but also affects the concentration of end groups (initiator fragments) and decomposition products. Common values for peroxides are 10-1000 g/t polymer.

Handling and safety issues are as well important aspects of polymerization processes, where large amounts of peroxides are used. Not only storage and metering of peroxide containing solutions have to be kept under observation but also process technology and process control have to be adapted to the safety requirements.

Surprisingly, it has now been found that hydroxylamine esters according to the invention are suitable initiators for the high pressure ethylene polymerization leading to high molecular weight polyethylenes with narrow molecular weight distributions (Poyldispersity Index PD=2-4.5). Additionally the PD of polyethylene produced according to the instant invention becomes even narrower, when the polymerization temperature is lowered (T<180° C.).

Prior art peroxides show an inverse behavior. The resulting polyethylenes generally have much broader PDs (PD=7-12) and narrower distributions can only be achieved with increasing temperatures (T>250° C.). This is for example described by G. Luft, H. Seidl in Angew. Macromol. Chem. 1985, 129, pp 61-70.

One possibility to achieve polyethylenes with narrow PD, in high pressure polymerization, is by the combined use of free radical generators and nitroxyl radicals as, for example, disclosed in EP 0 811 590 and U.S. Pat. No. 5,449,724. However, this process needs careful adjustment of the ratio of radical generator and nitroxyl radical according to different process conditions. Furthermore the nitroxyl radical is slowing down the polymerization rate, making high process temperatures necessary. However, high manufacturing temperatures are not desirable due to energy economics and side reactions of the polymerization process.

U.S. Pat. No. 6,479,608 discloses heterocyclic alkoxyamines, which are useful initiator/regulator compounds for the controlled polymerization of a variety of ethylenically unsaturated monomers. These compounds split into a regulating NO radical and an inititiating carbon centered radical.

The instant invention provides a different solution for the preparation of polyethylenes with even narrower polydispersities by using solely the hydroxylamine esters of the instant invention as radical initiators. These compounds allow an excellent control of the polyethylene polymerization process without the need to adjust the ratio of different molecules. Furthermore the process can be carried out advantageously at comparatively low temperatures. Moreover, as the method of the present invention can be performed at low temperatures, copolymers of ethylene with e.g. styrene, vinylacetate and narrow molecular weight distribution are accessible. These copolymers are not accessible at high temperatures due to the ceiling temperature of these monomers, which results otherwise in a polymerization/depolymerization equilibrium with only low molecular weight products unsuitable for industrial applications.

Hydroxylamine esters do not form any nitroxyl radicals during decomposition but selectively cleave into aminyl and carbon centered radicals, which surprisingly are able to initiate ethylene polymerization under high pressure. The result is a polyethylene with low polydispersity.

One aspect of the invention is a method for the polymerization or copolymerization of ethylene at an operating pressure of from 500 to 3500 bar, at a polymerization temperature between 100° and 400° C. in a suitable high pressure reactor, operating continuously or batch wise by the use of a radical polymerization initiator, characterized in that the radical polymerization initiator is a hydroxylamine ester containing a structural element of formula (I) or (I')

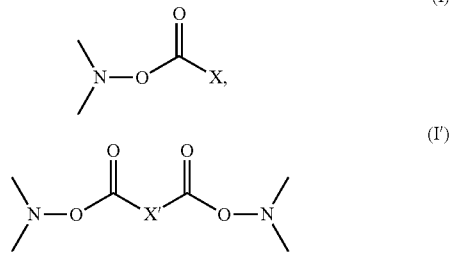

wherein
X is hydrogen, $C_1$-$C_{36}$alkyl, $C_1$-$C_{36}$alkyl which is substituted by halogen, $C_5$-$C_{12}$cycloalkyl, $C_7$-$C_{12}$bicyclo- or tricycloalkyl, $C_2$-$C_{36}$alkenyl, $C_2$-$C_{18}$alkynyl, $C_6$-$C_{10}$aryl, —O—$C_6$-$C_{10}$aryl, —NH—$C_6$-$C_{10}$aryl, —N($C_1$-$C_6$alkyl)$_2$;

X' is a direct bond or $C_1$-$C_{36}$alkylene, $C_2$-$C_{36}$alkenylene, $C_2$-$C_{36}$alkynylene, —($C_1$-$C_6$alkylene)-phenyl-($C_1$-$C_6$alkylene) or a group

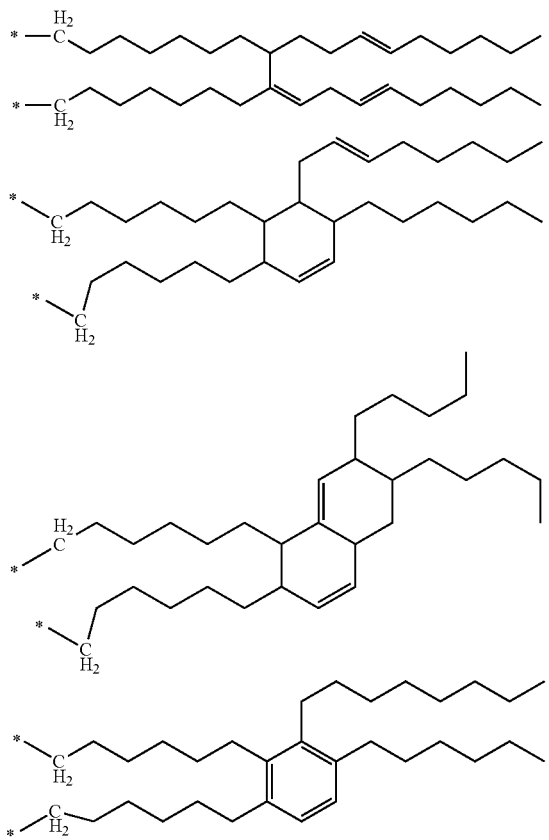

and
* indicates the bond to which the carbonyl groups are attached.

Preferably the operating pressure is of from 1000 to 3000 bar.

Preferably the polymerization temperature is of from 140° to 300° C.

In a preferred method the polydispersity, PD, of the resulting polyethylene is between 1.2 and 4.5, in particular between 1.2 and 3.5.

The hydroxylamine ester is, for example, used in an amount of from 5 to 500 parts per million, preferably of from 5 to 300 parts per million and more preferably of from 10 to 200 parts per million based on the weight of the total reaction mixture.

Suitable reactors for high pressure ethylene polymerization using peroxides are well known and for example described by H. Seidl, G. Luft, J. Macromol. Sci.-Chem. 1981, A15(1), pp. 1-33. The process is typically a continuous process using, for example, a continuous tubular reactor or a stirred autoclave reactor. A detailed flow sheet is for example given in U.S. Pat. No. 6,562,915

The hydroxylamine ester is preferably a compound of formula (Ia) or (I'a)

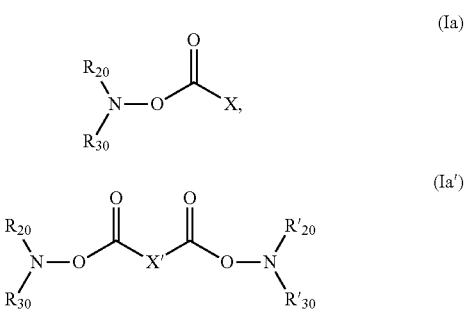

wherein
X is hydrogen, $C_1$-$C_{36}$alkyl, $C_1$-$C_{36}$alkyl which is substituted by halogen, $C_5$-$C_{12}$cycloalkyl, $C_7$-$C_{12}$bicyclo- or tricycloalkyl, $C_2$-$C_{36}$alkenyl, $C_2$-$C_{18}$alkynyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylene, $C_2$-$C_{36}$alkenylene, $C_2$-$C_{36}$alkynylene, phenylene, —($C_1$-$C_6$alkylene)-phenyl-($C_1$-$C_6$alkylene) or a group

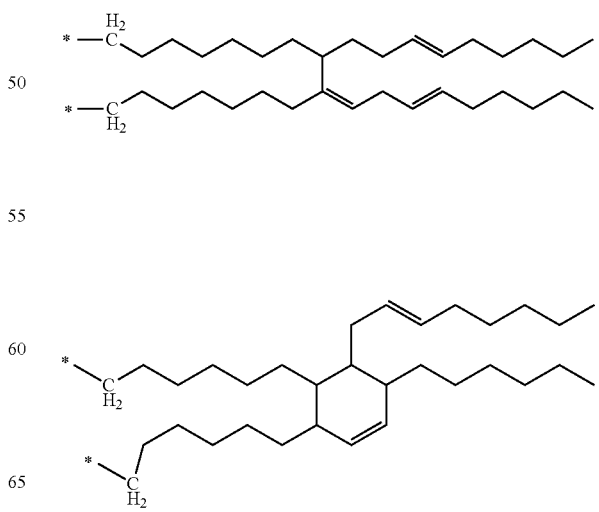

-continued

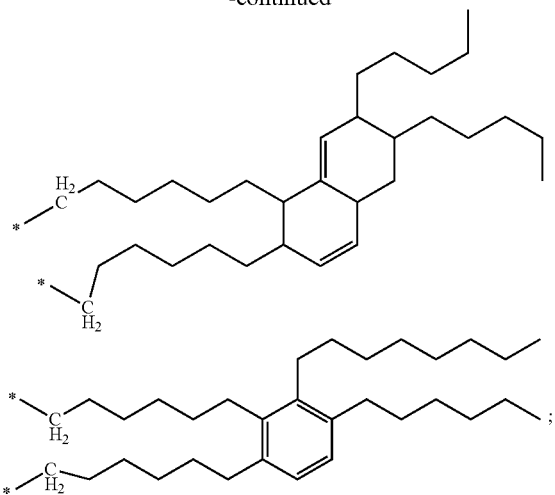

$R_{20}$, $R'_{20}$, $R_{30}$ and $R'_{30}$ are each independently of the others unsubstituted, halo-, CN—, $NO_2$— or —$COOR_{40}$-substituted or O— or $NR_{40}$-interrupted $C_1$-$C_{18}$alkyl, $C_2$-$C_{18}$alkenyl, $C_2$-$C_{18}$alkynyl;

$R_{40}$ is hydrogen, phenyl or $C_1$-$C_{18}$alkyl; or $R_{20}$ and $R_{30}$ and/or $R'_{20}$ and $R'_{30}$, together with the nitrogen atom to which they are bonded, form a 5- or 6-membered ring which may be interrupted by a nitrogen or oxygen atom and which may be substituted one or more times by $C_1$-$C_6$alkyl groups and carboxyl groups.

Any substituents that are $C_1$-$C_{12}$alkyl are, for example, methyl, ethyl, n-propyl, n-butyl, sec-butyl, tert-butyl, n-hexyl, n-octyl, 2-ethyl-hexyl, n-nonyl, n-decyl, n-undecyl or n-dodecyl. $C_1$-$C_{18}$Alkyl may be, for example, the groups mentioned above and also, in addition, for example, n-tridecyl, n-tetradecyl, n-hexadecyl and n-octadecyl.

$C_2$-$C_{36}$alkenyl may be, for example, 1-propenyl, allyl, methallyl, 2-butenyl, 2-pentenyl, 2-hexenyl, 2-octenyl or 4-tert-butyl-2-butenyl.

$C_2$-$C_{36}$alkinyl may be, for example, propinyl, butinyl, hexinyl or dodecinyl $C_5$-$C_{12}$Cycloalkyl is, for example, cyclopentyl, cyclohexyl or cycloheptyl.

Any substituents that are $C_2$-$C_{12}$alkylene are, for example, ethylene, propylene, 2,2-dimethyl-propylene, tetramethylene, hexamethylene, octamethylene, decamethylene or dodecamethylene.

Any substituents that are aryl are for example phenyl or naphthyl.

Any substituents that are $C_6$-$C_{12}$arylene are, for example, o-, m- or p-phenylene, 1,4-naphthylene or 4,4'-diphenylene.

Halogen is F, Cl, Br and I. Alkyl substituted by halogen is for example trifluormethyl.

The hydroxylamine esters are known and for example described in WO 02/092653.

Preparation of hydroxylamine esters that may advantageously be used in the above-mentioned method are described, for example, in U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156 and 5,300,544.

Further hydroxylamine esters and the preparation thereof are described in WO 01/90113.

Preferred hydroxylamine esters are of formula (Ia) wherein $R_{20}$ and $R_{30}$, together with the nitrogen atom to which they are bonded, form a piperidine ring which is substituted in the 2,2- and 6,6-positions by $C_1$-$C_4$alkyl groups and in the 4-position has an ether, amine, amide, urethane, ester or ketal group. Special preference is given to cyclic ketals.

For example the hydroxylamine esters of formula (A), (B), (C) or (O)

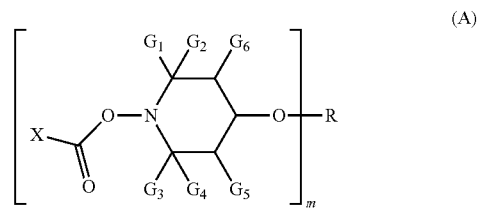

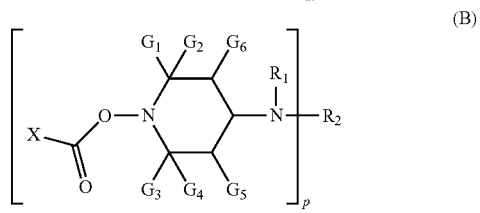

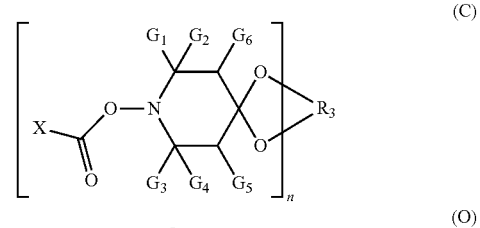

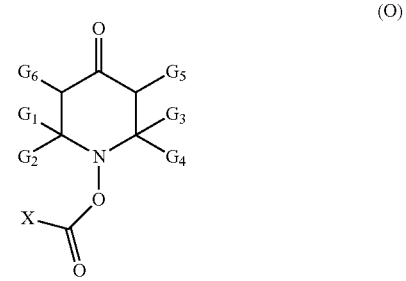

wherein $G_1$, $G_2$, $G_3$ and $G_4$ are each independently of the others alkyl having from 1 to 4 carbon atoms;

$G_5$ and $G_6$ are each independently of the other hydrogen or $C_1$-$C_4$alkyl;

m is a number 1-2;

R, when m is 1, is hydrogen, uninterrupted $C_1$-$C_{18}$alkyl or $C_2$-$C_{18}$alkyl interrupted by one or more oxygen atoms, or is cyanoethyl, benzoyl, glycidyl, a monovalent radical of an aliphatic carboxylic acid having from 2 to 18 carbon atoms, of a cycloaliphatic carboxylic acid having from 7 to 15 carbon atoms or of an α,β-unsaturated carboxylic acid having from 3 to 5 carbon atoms or of an aromatic carboxylic acid containing from 7 to 15 carbon atoms, it being possible for each carboxylic acid to be substituted in the aliphatic, cycloaliphatic or aromatic unit by from 1 to 3 groups —$COOZ_{12}$ wherein $Z_{12}$ is hydrogen, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or is a monovalent silyl radical;

R, when m is 2, is $C_2$-$C_{12}$alkylene, $C_4$-$C_{12}$alkenylene, xylylene, a bivalent radical of an aliphatic dicarboxylic acid having from 2 to 36 carbon atoms or of a cycloaliphatic or aromatic dicarboxylic acid having from 8 to 14 carbon atoms or of an aliphatic, cycloaliphatic or aromatic dicarbamic acid having from 8 to 14 carbon atoms, it being possible for each dicarboxylic acid to be substituted in the aliphatic, cycloaliphatic or aromatic unit by one or two groups —$COOZ_{12}$; or R is a bivalent radical of a phosphorus-containing acid or a bivalent silyl radical;

p is 1, $R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_2$ is $C_1$-$C_{18}$alkyl, $C_5$-$C_7$cycloalkyl, $C_2$-$C_8$alkenyl, each unsubstituted or substituted by a cyano, carbonyl or carbamide group, or is glycidyl, a group of formula —$CH_2CH(OH)$—Z or of formula —CO—Z or —CONH—Z, wherein Z is hydrogen, methyl or phenyl;

n is a number 1 or 2;

when n is 1, $R_3$ is $C_2$-$C_8$alkylene or hydroxyalkylene or $C_4$-$C_{36}$acyloxyalkylene; or, when n is 2, $R_3$ is (—$CH_2$)$_2$C($CH_2$—)$_2$ and X is as defined above.

A likewise preferred group consists of hydroxylamines wherein $G_1$ and $G_2$ are ethyl and $G_3$ and $G_4$ are methyl, or $G_1$ and $G_3$ are ethyl and $G_2$ and $G_4$ are methyl; and $G_5$ and $G_6$ are each independently of the other hydrogen or methyl.

$C_4$-$C_{36}$Acyloxyalkylene is, for example, 2-ethyl-2-acetoxymethylpropylene. $R_3$ is especially a group of the formula

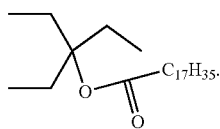

The other substituents have the definitions, including the preferred meanings, given above.

Preferably the substituent X is selected from the group consisting of $C_1$-$C_{36}$alkyl, $C_2$-$C_{19}$alkenyl and $C_6$-$C_{10}$aryl.

Special preference is given to a hydroxylamine ester of formula (C')

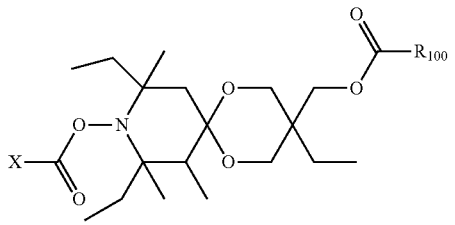

wherein X is hydrogen or $C_1$-$C_{18}$alkyl and $R_{100}$ is $C_4$-$C_{24}$alkyl Further suitable hydroxylamine esters are oligomers or polymers obtained by reacting a dicarboxylic acid with a compound of formula A1 or B1 or by reacting a diisocyanate with a compound of formula A1

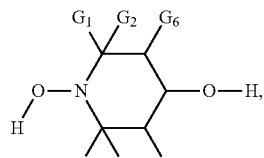

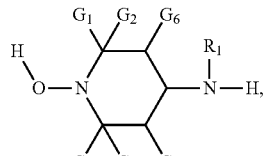

wherein $G_1$, $G_2$, $G_3$ and $G_4$ are each independently of the others $C_1$-$C_4$alkyl, or $G_1$ and $G_2$ together and $G_3$ and $G_4$ together, or $G_1$ and $G_2$ together or $G_3$ and $G_4$ together are pentamethylene;

$G_5$ and $G_6$ are each independently of the other hydrogen or $C_1$-$C_4$alkyl; and $R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl.

The compounds of formula A1 may be reacted to form polyesters. The polyesters may be homo- or co-polyesters that are derived from aliphatic, cycloaliphatic or aromatic dicarboxylic acids and diols and a compound of formula A1.

The aliphatic dicarboxylic acids may contain from 2 to 40 carbon atoms, the cycloaliphatic dicarboxylic acids from 6 to 10 carbon atoms, the aromatic dicarboxylic acids from 8 to 14 carbon atoms, the aliphatic hydroxycarboxylic acids from 2 to 12 carbon atoms and the aromatic and cycloaliphatic hydroxycarboxylic acids from 7 to 14 carbon atoms.

It is also possible for the polyesters, in small amounts, for example from 0.1 to 3 mol %, based on the dicarboxylic acids present, to be branched by means of more than difunctional monomers (for example, pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those having from 2 to 40 carbon atoms, for example oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclo-pentanedicarboxylic acid, 1,3- and 1,4-cyclohexanedicarboxylic acid, 1,3- and 1,4-(dicarboxylmethyl)cyclohexane and 4,4'-dicyclohexyl-dicarboxylic acid.

Suitable aromatic dicarboxylic acids are: especially terephthalic acid, isophthalic acid, o-phthalic acid, and 1,3-, 1,4-, 2,6- or 2,7-naphthalenedicarboxylic acid, 4,4'-diphenyl-dicarboxylic acid, 4,4'-diphenylsulfonedicarboxylic acid, 4,4'-benzophenonedicarboxylic acid, 1,1,3-trimethyl-5-carboxyl-3-(p-carboxylphenyl)-indan, 4,4'-diphenyl ether dicarboxylic acid, bis-p-(carboxylphenyl)-methane or bis-p-(carboxylphenyl)-ethane.

Preference is given to the aromatic dicarboxylic acids and, amongst those, especially terephthalic acid, isophthalic acid and 2,6-naphthalenedicarboxylic acid.

Further suitable dicarboxylic acids are those that contain —CO—NH— groups; they are described in DE-A 2 414 349. Dicarboxylic acids that contain N-heterocyclic rings are also suitable, for example those that are derived from carboxylalkylated, carboxylphenylated or carboxybenzylated monoamine-s-triazinedicarboxylic acids (cf. DE-A 2 121 184 and 2 533 675), mono- or bis-hydantoins, optionally halogenated benzimidazoles or parabanic acid. The carboxyalkyl groups therein may contain from 3 to 20 carbon atoms.

When additional diols are used, suitable aliphatic diols are the linear and branched aliphatic glycols, especially those having from 2 to 12, more especially from 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol and 1,12-dodecanediol. A suitable cycloaliphatic diol is, for example, 1,4-dihydroxycyclohexane. Further suitable aliphatic diols are, for example, 1,4-bis(hydroxymethyl)cyclohexane, aromatic-aliphatic diols such as p-xylylene glycol or 2,5-dichloro-p-xylylene glycol, 2,2-(β-hydroxyethoxyphenyly propane and also polyoxyalkylene glycols such as diethylene glycol, triethylene glycol, polyethylene glycol and polypropylene glycol. The alkylene diols are preferably linear and contain especially from 2 to 4 carbon atoms.

Polyoxyalkylene glycols having molecular weights of from 150 to 40 000 are also suitable.

As aromatic diols mention is made of those wherein two hydroxy groups are bonded to one or to different aromatic hydrocarbon radical(s).

Preferred diols are the alkylene diols, and 1,4-dihydroxycyclohexane and 1,4-bis(hydroxy-methyl)cyclohexane. Special preference is given to ethylene glycol, 1,4-butanediol, and also 1,2- and 1,3-propylene glycol.

Further suitable aliphatic diols are the β-hydroxyalkylated, especially β-hydroxyethylated, bisphenols such as 2,2-bis[4'-(β-hydroxyethoxy)phenyl]propane. Further bisphenols are mentioned hereinafter.

A further group of suitable aliphatic diols comprises the heterocyclic diols described in German Offenlegungsschriften 1 812 003, 2 342 432, 2 342 372 and 2 453 326. Examples are: N,N'-bis(β-hydroxyethyl)-5,5-dimethyl-hydantoin, N,N'-bis(β-hydroxypropyl)-5,5-dimethyl-hydantoin, methylenebis[N-(β-hydroxyethyl)-5-methyl-5-ethylhydantoin], methylenebis[N-(β3-hydroxyethyl)-5,5-dimethylhydantoin], N,N'-bis(β-hydroxyethyl) benzimidazolone, N,N'-bis(β-hydroxyethyl)-(tetrachloro)-benzimidazolone and N,N'-bis(β-hydroxyethyl)-(tetrabromo)-benzimidazolone.

Suitable aromatic diols include mononuclear diphenols and, especially, binuclear diphenols carrying a hydroxyl group on each aromatic nucleus. "Aromatic" is understood to refer preferably to hydrocarbon-aromatic radicals, for example phenylene or naphthylene. Besides, for example, hydroquinone, resorcinol and 1,5-, 2,6- and 2,7-dihydroxynaphthalene, special mention should be made of bisphenols that can be represented by the following formulae:

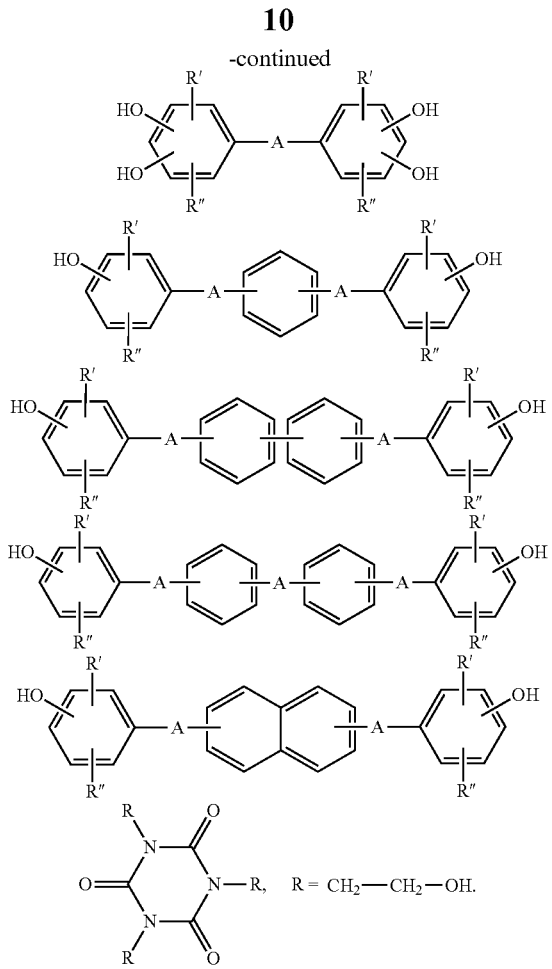

The hydroxyl groups may be in the m-position, but especially in the p-position; R' and R" in those formulae may be alkyl having from 1 to 6 carbon atoms, halogen such as chlorine or bromine, and especially hydrogen atoms. A can denote a direct bond or —O—, —S—, —(O)S(O)—, —C(O)—, —P(O)($C_1$-$C_{20}$alkyl)-, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloro-ethylidene and trichloroethylidene.

Examples of unsubstituted or substituted alkylene are methylene, ethylene, phenyl-methylene, diphenylmethylene and methylphenylmethylene. Examples of cycloalkylidene are cyclopentylidene, cyclohexylidene, cycloheptylidene and cyclooctylidene.

Examples of bisphenols are: bis(p-hydroxyphenyl) ether or thioether, bis(p-hydroxyphenyl)-sulfone, bis(p-hydroxyphenyl)methane, bis(4-hydroxyphenyl)-2,2'-biphenyl, phenylhydro-quinone, 1,2-bis(p-hydroxyphenyl)ethane, 1-phenyl-bis(p-hydroxyphenyl)methane, diphenyl-bis(p-hydroxyphenyl)methane, diphenyl-bis(p-hydroxyphenyl) ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis (3',5'-dimethyl-4'-hydroxyphenyl)-propane, 1,1- or 2,2-bis(p-hydroxyphenyl)butane, 2,2-bis(p-hydroxyphenyl) hexafluoro-propane, 1,1-dichloro- or 1,1,1-trichloro-2,2-bis(p-hydroxyphenyl)ethane, 1,1-bis(p-hydroxy-phenyl) cyclopentane and especially 2,2-bis(p-hydroxyphenyl) propane (bisphenol A) and 1,1-bis(p-hydroxyphenyl) cyclohexane (bisphenol C).

Suitable polyesters of hydroxycarboxylic acids are, for example, polycaprolactone, polypivalolactone and the polyesters of 4-hydroxycyclohexanecarboxylic acid, 2-hydroxy-6-naphthalenecarboxylic acid or 4-hydroxybenzoic acid.

Furthermore, polymers that may contain mainly ester bonds, but also other bonds, for example polyester amides and polyester imides, are also suitable.

Oligomers/polymers are obtained which contain, as structural repeating unit, a group of formula A2 wherein the

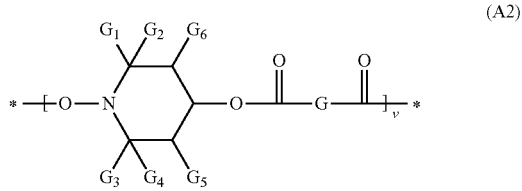

substituents $G_1$-$G_6$ are as defined hereinbefore, v is a number 2-200 and the meaning of G results from the dicarboxylic acid used. Suitable dicarboxylic acids are mentioned hereinbefore.

When a compound of formula B1 is reacted with the described dicarboxylic acids and, optionally, further diols, polyester amides are obtained having the structural repeating unit (B2)

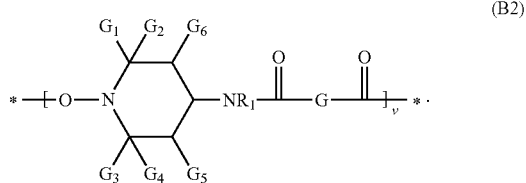

The definitions of the substituents are given hereinbefore.

A third group of very suitable oligomers/polymers comprises polyurethanes that are obtained by reacting diisocyanates with compounds of formula A1 and, optionally, further diols.

Very suitable diisocyanates are 1,6-bis[isocyanato]hexane, 5-isocyanato-3-(isocyanatomethyl)-1,1,3-trimethyl-cyclohexane, 1,3-bis[5-isocyanato-1,3,3-trimethyl-phenyl]-2,4-dioxo-1,3-diazetidine, 3,6-bis[9-isocyanato-nonyl]-4,5-di(1-heptenyl)cyclohexene, bis[4-isocyanato-cyclohexyl]methane, trans-1,4-bis[isocyanato]cyclohexane, 1,3-bis[isocyanatomethyl]-benzene, 1,3-bis[1-isocyanato-1-methyl-ethyl]benzene, 1,4-bis[2-isocyanato-ethyl]cyclohexane, 1,3-bis[isocyanatomethyl]cyclohexane, 1,4-bis[1-isocyanato-1-methylethyl]penzene, bis[isocyanato]isododecylbenzene, 1,4-bis[isocyanato]benzene, 2,4-bis[isocyanato]toluene, 2,6-bis[isocyanato]toluene, 2,4-/2,6-bis[isocyanato]toluene, 2-ethyl-1,2,3-tris[3-isocyanato-4-methyl-anilinocarbonyloxy]propane, N,N'-bis[3-isocyanato-4-methylphenyl]urea, 1,4-bis[3-isocyanato-4-methylphenyl]-2,4-dioxo-1,3-diazetidine, 1,3,5-tris[3-isocyanato-4-methylphenyl]-2,4,6-trioxohexahydro-1,3,5-triazine, 1,3-bis[3-isocyanato-4-methylphenyl]-2,4,5-trioxoimidazolidine, bis[2-isocyanatophenyl]methane, (2-isocyanato-phenyl)-(4-isocyanato-phenyl)-methane, bis[4-isocyanato-phenyl]methane, 2,4-bis-[4-isocyanatobenzyl]-1-isocyanatobenzene, [4-isocyanato-3-(4-isocyanato-benzyl)-phenyl]-[2-isocyanato-5-(4-isocyanato-benzyl)-phenyl]methane, tris[4-isocyanato-phenyl]methane, 1,5-bis[isocyanato]-naphthalene and 4,4'-bis[isocyanato]-3,3'-dimethyl-biphenyl.

Especially preferred diisocyanates are 1,6-bis[isocyanato]hexane, 5-isocyanato-3-(isocyanatomethyl)-1,1,3-trimethyl-cyclohexane, 2,4-bis[isocyanato]toluene, 2,6-bis[isocyanato]-toluene, 2,4/2,6-bis[isocyanato]toluene or bis[4-isocyanato-phenyl]methane.

Polyurethanes having the structural repeating unit (A3)

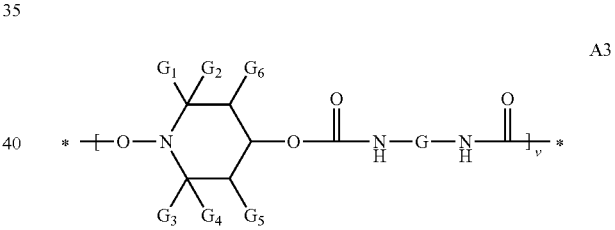

are obtained. The substituents are defined hereinbefore. The meaning of G results from the diisocyanates used.

Especially suitable individual compounds are mentioned herein below, Table 1.

TABLE 1

| Compound no. | Structural formula |
| --- | --- |
| 101 | |

TABLE 1-continued
| Compound no. | Structural formula |
|---|---|
| 102 | 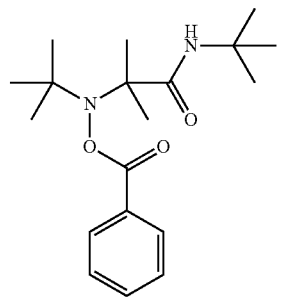 [SMILES: CC(C)(C)NC(=O)C(C)(C)N(OC(=O)c1ccccc1)C(C)(C)C] |
| 103 | 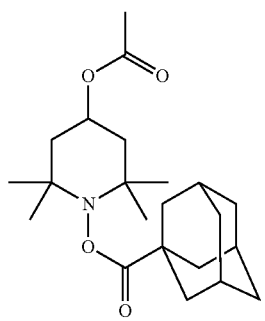 [SMILES: CC(=O)OC1CC(C)(C)N(OC(=O)C23CC4CC(CC(C4)C2)C3)C(C)(C)C1] |
| 104 | 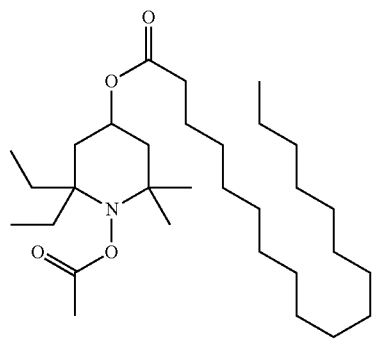 [SMILES: CCCCCCCCCCCCCCCCCC(=O)OC1CC(C)(C)N(OC(C)=O)C(CC)(CC)C1] |
| 105 | 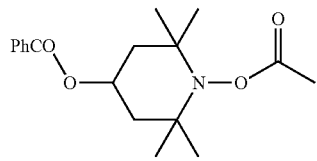 |
| 106 | 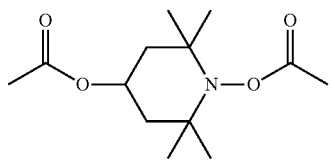 [SMILES: CC(=O)OC1CC(C)(C)N(OC(C)=O)C(C)(C)C1] |
| 107 | 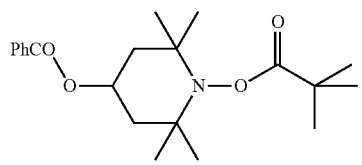 |

TABLE 1-continued

| Compound no. | Structural formula |
|---|---|
| 108 | |
| 109 | |
| 110 | |
| 111 | |
| 112 | |
| 113 | |

TABLE 1-continued
| Compound no. | Structural formula |
|---|---|
| 114 | 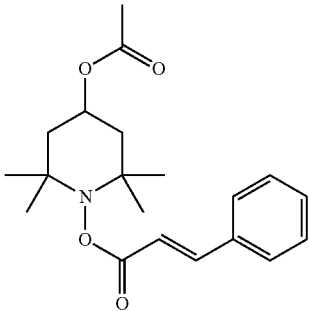 [SMILES: CC(=O)OC1CC(C)(C)N(OC(=O)/C=C/c2ccccc2)C(C)(C)C1] |
| 115 | 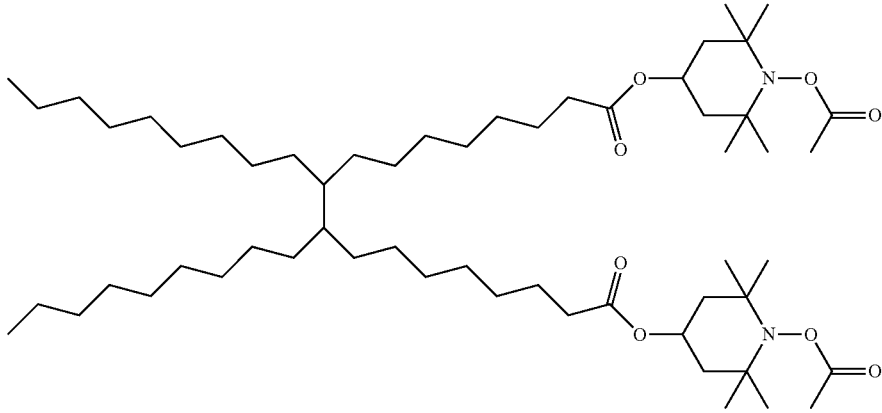 [SMILES: CCCCCCCCCC(CCCCCCCC(=O)OC1CC(C)(C)N(OC(C)=O)C(C)(C)C1)C(CCCCCCCCC)CCCCCCCC(=O)OC1CC(C)(C)N(OC(C)=O)C(C)(C)C1] |
| 116 | 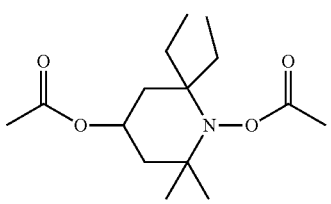 [SMILES: CCC1(CC)CC(OC(C)=O)CC(C)(C)N1OC(C)=O] |
| 117 | 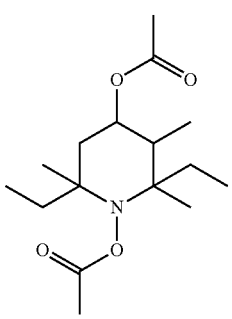 [SMILES: CCC1(C)CC(OC(C)=O)C(C)C(C)(CC)N1OC(C)=O] |

TABLE 1-continued

| Compound no. | Structural formula |
|---|---|
| 118 | |
| 119 | |
| 120 | |
| 121 | |
| 122 | |
| 123 | |

TABLE 1-continued
| Compound no. | Structural formula |
|---|---|
| 124 | 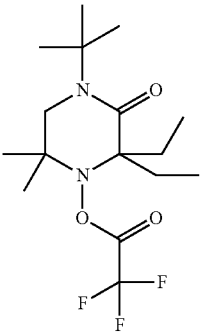 [SMILES: CCC1(CC)C(=O)N(C(C)(C)C)CC(C)(C)N1OC(=O)C(F)(F)F] |
| 125 | 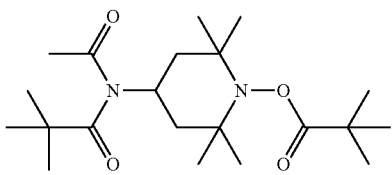 [SMILES: CC(=O)N(C(=O)C(C)(C)C)C1CC(C)(C)N(OC(=O)C(C)(C)C)C(C)(C)C1] |
| 126 | 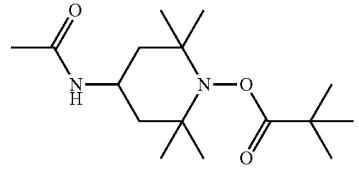 [SMILES: CC(=O)NC1CC(C)(C)N(OC(=O)C(C)(C)C)C(C)(C)C1] |
| 127 | 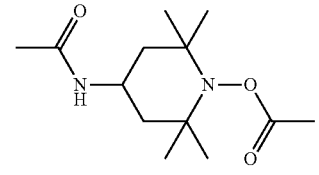 [SMILES: CC(=O)NC1CC(C)(C)N(OC(C)=O)C(C)(C)C1] |
| 128 | 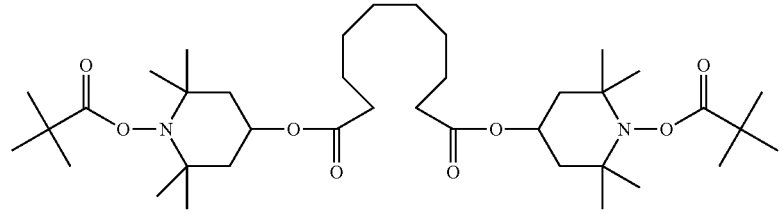 [SMILES: CC(C)(C)C(=O)ON1C(C)(C)CC(OC(=O)CCCCCCCCC(=O)OC2CC(C)(C)N(OC(=O)C(C)(C)C)C(C)(C)C2)CC1(C)C] |
| 129 | 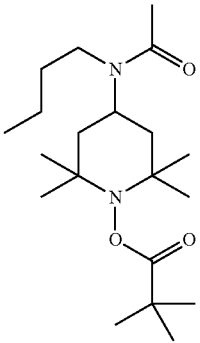 [SMILES: CCCCN(C(C)=O)C1CC(C)(C)N(OC(=O)C(C)(C)C)C(C)(C)C1] |

TABLE 1-continued

| Compound no. | Structural formula |
|---|---|
| 130 | |
| 131 | |
| 132 | |
| 133 | |
| 134 | |

TABLE 1-continued

| Compound no. | Structural formula |
| --- | --- |
| 135 | |
| 136 | |
| 137 | |
| 138 | |

TABLE 1-continued

| Compound no. | Structural formula |
| --- | --- |
| 139 | |
| 140 | |
| 141 | |
| 142 | |

TABLE 1-continued

| Compound no. | Structural formula |
|---|---|
| 143 | |
| 144 | |
| 145 | |
| 146 | |

TABLE 1-continued
| Compound no. | Structural formula |
|---|---|
| 147 | 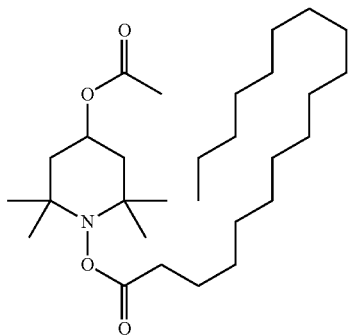 [SMILES: CCCCCCCCCCCCCCCCCC(=O)ON1C(C)(C)CC(OC(C)=O)CC1(C)C] |
| 148 | Polymer from 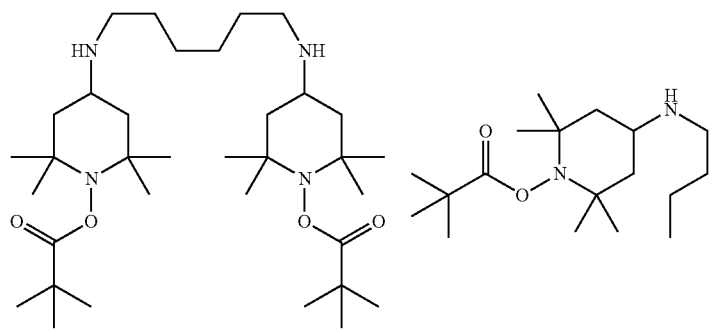 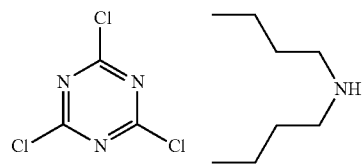 |
| 149 | Polymer from 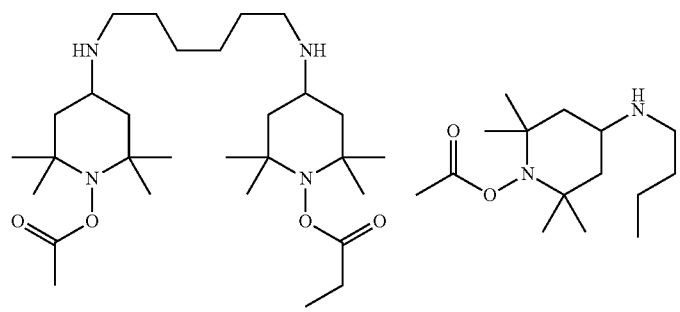 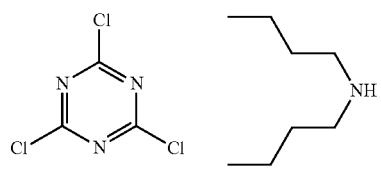 |

TABLE 1-continued

| Compound no. | Structural formula |
|---|---|
| 150 | Polymer from 2,2,6,6-tetraethyl-3,5-dimethyl-4-hydroxy-1-hydroxypiperidine and terephthalic acid |
| 151 | Polymer from 2,2,6,6-tetraethyl-3,5-dimethyl-4-hydroxy-1-hydroxypiperidine and isophthalic acid |
| 152 | Polymer from 2,2,6,6-tetraethyl-3,5-dimethyl-4-hydroxy-1-hydroxypiperidine, terephthalic acid and isophthalic acid |
| 153 | Polymer from 2,2,6,6-tetraethyl-3,5-dimethyl-4-hydroxy-1-hydroxypiperidine and adipic acid |
| 154 | Polymer from 2,2,6,6-tetraethyl-3,5-dimethyl-4-hydroxy-1-hydroxypiperidine, terephthalic acid and adipic acid |

In a specific embodiment of the invention an additional organic radical initiator is added.

Examples of free-radical initiators will be known to the person skilled in the art and are commercially available, for example:

2,2'-azo-bis(2-methyl-butyronitrile)=AIBN, 2,2'-azo-bis(2,4-dimethylvaleronitrile), 2,2'-azo-bis(4-methoxy-2,4-dimethylvaleronitrile), 1,1'-azo-bis(1-cyclohexanecarbonitrile), 2,2'-azo-bis(isobutyramide) dihydrate, 2-phenylazo-2,4-dimethyl-4-methoxyvaleronitrile, dimethyl-2,2'-azo-bisisobutyrate, 2-(carbamoylazo)isobutyronitrile, 2,2'-azo-bis(2,4,4-tri-methylpentane), 2,2'-azo-bis(2-methylpropane), 2,2'-azo-bis(N,N'-dimethylene-isobutyroamidine) in the free base or hydrochloride form, 2,2'-azo-bis(2-amidinopropane) in the free base or hydrochloride form, 2,2'-azo-bis{2-methyl-N-[1,1-bis(hydroxymethyl)ethyl]propionamide} or 2,2'-azo-bis{2-methyl-N-[1,1-bis(hydroxymethyl)-2-hydroxy-ethyl]propionamide}.

Acetyl cyclohexane-sulfonyl peroxide, diisopropyl-peroxy-dicarbonate, tert-amyl perneodecanoate, tert-butyl perneodecanoate, tert-butyl perpivalate, tert-amyl perpivalate, di(2,4-dichlorobenzoyl) peroxide, diisononanoyl peroxide, didecanoyl peroxide, dioctanoyl peroxide, dilauroyl peroxide, di(4-methyl-benzoyl) peroxide, disuccinic acid peroxide, diacetyl peroxide, dibenzoyl peroxide=BPO, tert-butyl per-2-ethyl hexanoate, di(4-chloro-benzoyl) peroxide, tert-butyl perisobutyrate, tert-butyl permalei nate, 1,1-bis(tert-butylperoxy)-3,5,5-trimethylcyclohexane, 1,1-bis(tert-butylperoxy)cyclohexane, tert-butyl-peroxy-isopropyl carbonate, tert-butyl perisononaoate, 2,5-dimethylhexane-2,5-dibenzoate, tert-butyl peracetate, tert-amyl perbenzoate, tert-butyl perbenzoate, diisopropyl peroxydicarbonate, bis(4-tert-butylcyclohexyl) peroxydicarbonate, 2,2-bis(tert-butylperoxy)butane, 2,2-bis(tert-butyl-peroxy)propane, dicumyl peroxide=DCP, 2,5-dimethyl hexane-2,5-di-tert-butyl peroxide, 3-tert-butylperoxy-3-phenyl phthalide, di-tert-amyl peroxide, 1,3-bis(tert-butylperoxy-isopropyl)benzene, 3,5-bis(tert-butylperoxy)-3,5-dimethyl-, 2-dioxolane, di-tert-butyl peroxide, 2,5-dimethyl-hexyne-2,5-di-tert-butyl peroxide, n-butyl 4,4-di(tert-butyl peroxy)valerate, ethyl 3,3-di(tert-butyl peroxy)butyrate, di(1-hydroxycyclohexyl) peroxide, dibenzyl peroxide, tert-butyl-cumyl peroxide, 3,3,6,6,9,9-hexamethyl-1,2,4,5-tetraoxa-cyclononane, p-menthane hydroperoxide, pinane hydroperoxide, diisopropylbenzene mono-hydroperoxide, cumene hydroperoxide, methyl ethyl ketone peroxide and tert-butyl hydroperoxide.

There may also be mentioned commercially available 'C free-radical-formers', for example: 2,3-dimethyl-2,3-di phenyl butane, 3,4-dimethyl-3,4-diphenyl hexane or poly-1,4-diisopropylbenzene.

Where appropriate, combinations of such free-radical-formers may also be used.

Particularly preferred are the organic peroxides selected from the group consisting of isobutyryl-peroxide, isopropylperoxy-dicarbonate, di-n-butylperoxy-dicarbonate, di-sec-butyl peroxy-dicarbonate, dicyclohexyl peroxy-dicarbonate, di(2-ethyl hexyl)peroxy-dicarbonate, t-butyl-perneodecanoate, t-butyl-perpivalate, bis(3,5,5-trimethyl-hexanoyl)peroxide, didecanoyl-peroxide, dilauroyl-peroxide, t-butyl-perisobutyrate, t-butyl-per2-ethyl-hexanoate, t-butyl-peracetate, t-butyl-per-3,5,5-trimethylhexanoate, t-butyl-perbenzoate, di-t-butyl-peroxide, t-butyl-hydroperoxide and di-t-amyl peroxide.

In another embodiment of the invention additionally a chain transfer agent is added.

The chain transfer agent is, for example, selected from the group consisting of ketones, aldehydes, $C_3$-$C_{20}$alkanes, $C_3$-$C_{20}$alkenes, mercaptanes and disulfides.

Specific examples for sulfur containing compounds are mercaptoethanol, dodecylmercaptane, dibenzylsufide, dibutylsulfide, octadecyldisulfide, distearylthiodi propionate (Irganox PS 802), dipalmityldithiodipropionate, dilaurylthiodipropionate (Irganox® PS 800).

Most preferred is dodecylmercaptane.

Chain transfer agents are known and for example described in "The Chemistry of Free Radical Polymerization", Ed. G. Moad, E. Rizzardo, Pergamon 1995, pages 234-251. They are largely items of commerce.

In a further embodiment of the invention the method is carried out in the presence of a comonomer, which is selected from a monomer containing a vinyl group, an allyl group, a vinylidene group, a diene group or a olefinic group other than ethylene.

The term vinyl group containing monomer is understood to mean in particular (meth)acrylates, vinylaromatic monomers, vinylesters, vinyl ethers, (meth)acrylonitrile, (meth)acrylamide, mono and di($C_3$-$C_{18}$alkyl)(meth)acrylamides and monoesters and diesters of maleic acid.

Mention may be made as examples of useful (meth)acrylates of glycidyl, methyl, ethyl, 2,2,2-trifluoroethyl, n-propyl, isopropyl, n-butyl, sec-buty, tert-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, isobornyl, hydroxypropyl (meth)acrylates.

The term vinylaromatic monomer is understood to mean, for example, styrene, vinyltoluene, α-methylstyrene, 4-methoxystyrene, 2-(hydroxymethyl)styrene, 4-ethylstyrene, vinylanthracene.

Mention may be made as vinyl esters, of vinyl acetate, vinyl propionate, vinyl chloride and vinyl fluoride, as vinyl ethers, of vinyl methyl ether and vinyl ethyl ether.

An example of a vinylidene monomer is vinylidene fluoride.

The term diene group containing monomer is understood to mean a diene chosen from conjugated or nonconjugated, linear or cyclic dienes, such as, for example, butadiene, 2,3-dimethyl-butadiene, 1,5-hexadiene, 1,9-decadiene, 5-methylene-2-norbornene, 1,5 cyclooctadiene or 4,7,8,9-tetrahydroindene.

Typically other olefinic monomers than ethylene are, for example, propylene, 1-butene, 4-methyl-1-pentene, octene or 1-decene.

Further comonomers may be maleic acid anhydride, fumaric acid anhydride or itaconic acid anhydride and N-alkyl or N-arylmaleimide.

Particulary preferred comonomers are methylacrylate, ethylacrylate, n-butylacrylate, vinylacetate, styrene, α-methylstyrene and methylmethacrylate.

The proportion of comonomers for the preparation of random copolymers of ethylene may be in general from 0 to 90% by weight, preferably from 0 to 50% by weight and in particular from 0 to 10% by weight.

A further aspect of the invention is the use of a hydroxylamine ester containing a structural element of formula (I) or (I') as radical forming species for the continuous or batch wise polymerization or copolymerization of ethylene at an operating pressure of from 500 to 3500 bar, at a polymerization temperature between 100° and 400° C. in a suitable high pressure reactor.

The following examples illustrate the invention.

General Polymerization Procedure

The ethylene polymerization experiments are carried out in a continuously operating laboratory plant. The center piece is a small stirred tank autoclave with jacket heating and 15 mL capacity. The polymerizations can be carried out at pressures up to 3000 bar and temperatures up to 300° C. The ethylene is compressed by means of a multistage diaphragm compressor. The initiator is dissolved in dry hexane and passed into the reactor through a metering device. Polymer samples can be separated from the reactor by a heated needle valve at the bottom of the autoclave. The formed polymer is separated from the unreacted ethylene by pressure release and the amount (conversion) is determined by gravimetry. The reaction parameters, mass flows and valves are computer controlled.

All polymerization experiments are carried out at a pressure of 1800 bar, the mean residence time in the autoclave is 120 sec. The corresponding polymerization temperatures can be taken from Table 1. The initiator consumption (efficiency) per kg polymer can be calculated from the conversion and the amount of initiator used.

Molecular weights and molecular weight distributions (PD) are determined by gel permeation chromatography in trichlorobenzene (140° C.) calibrated with polystyrene standards.

The hydroxylamine ester used is compound 139, prepared according to WO 01/90113

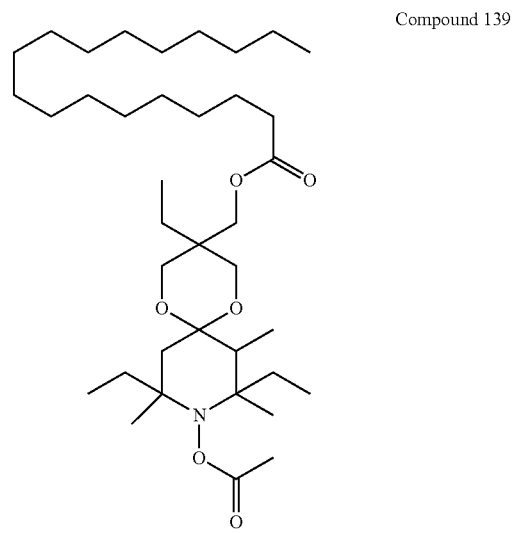 [SMILES: CCCCCCCCCCCCCCCCCC(=O)OCC1(CC)COC2(CC(C)(CC)N(OC(C)=O)C(C)(CC)C2C)OC1]

Compound 139

TABLE 1 reaction conditions and analysis of LDPEs manufactured by high pressure polymerization of ethylene initiated by compound 139

| Specimen | Compound 139/ mol ppm | Reaction Temp./ 0° C. | Conversion/ % | Initiator efficiency/ $g/kg_{polymer}$ | $M_n$/ g/mol | $M_w$/ g/mol | PD- | Number of branches $CH_3$/1000 C. | MVR* 190/21.6/ $cm^3$/10 min |
|---|---|---|---|---|---|---|---|---|---|
| Example 1 | 15 | 205 | 13 | 1.3 | 8.45E+04 | 3.67E+05 | 4.3 | 22.5 | 0.34 |
| Example 2 | 30 | 170 | 1.5 | 22.3 | 8.11E+04 | 2.84E+05 | 3.5 | 17.9 | ** |
| Example 3 | 15 | 170 | 1.4 | 12.4 | 1.16E+05 | 3.89E+05 | 3.4 | 15.3 | ** |
| Example 4 | 30 | 160 | 2.7 | 25.1 | 2.02E+05 | 5.47E+05 | 2.7 | 15.6 | <0.1 |
| Lupolen 2420 F (commercial prod.)*** | — | — | — | — | | | | | 79.9 |
| Comparative example**** | — | 230 | 28.8 | 0.6 | 2.32E+04 | 1.87E+05 | 8.1 | 14.1 | 10.9 |

*according to ISO1133
**not determined
***producer: Basell Polyolefins
***initiated by 30 mol ppm t-butylperbenzoate The data in Table 1 show that polymerizations carried out according to the invention lead to polyethylenes having high molecular weights (small MVR values) and narrow molecular weight distributions (PDs) whereas the polymer specimen from the comparative example as well as the commercial product show very broad PDs at even lower molecular weights.

The invention claimed is:

1. A method for the polymerization or copolymerization of ethylene, which method comprises:
   polymerizing or copolymerizing ethylene at an operating pressure of from 1000 to 3000 bar, at a polymerization temperature between 140° C. and 205° C. in a high pressure reactor, operating continuously or batch wise and
   in the presence of a radical polymerization initiator, wherein the polydispersity, PD, of the resulting polyethylene is between 1.2 and 4.5, as measured by gel permeation chromatography, and the weight average molecular weight of the resulting polyethylene is at least 284,000 to 547,000 g/mol, characterized in that the radical polymerization initiator is a hydroxylamine ester of formula (C') used in an amount of from 5 to 200 parts per million based on the weight of the total reaction mixture, wherein solely the hydroxylamine ester of formula (C') is used as the radical initiator, Formula (C')

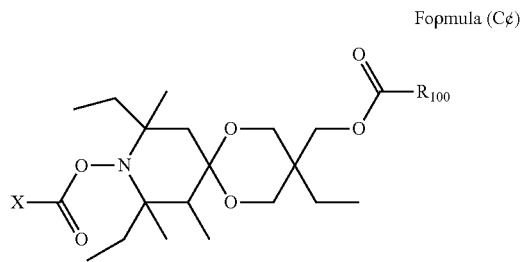

wherein X is hydrogen or $C_1$-$C_{18}$ alkyl and $R_{100}$ is $C_4$-$C_{24}$ alkyl.

2. The method according to claim 1, wherein the hydroxylamine ester is

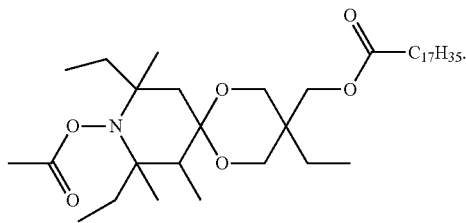

3. The method according to claim 1, wherein additionally a chain transfer agent is added.

4. The method according to claim 3, wherein the chain transfer agent is selected from the group consisting of ketones, aldehydes, $C_3$-$C_{20}$alkanes, $C_3$-$C_{20}$alkenes, mercaptanes and disulfides.

5. The method according to claim 1, wherein a comonomer is present which is a monomer containing a vinyl group, an allyl group, a vinylidene group, a diene group or an olefinic group and which is other than ethylene.

6. The method according to claim 5, wherein the comonomer is selected from the group consisting of methyl acrylate, ethyl acrylate, n-butyl acrylate, vinyl acetate, styrene, a-methylstyrene and methyl methacrylate.

7. The method according to claim 1, wherein the hydroxylamine ester is present in the amount of from 10 to 200 parts per million based on the weight of the total reaction mixture.

* * * * *